(12) United States Patent
Boyer et al.

(10) Patent No.: US 9,639,513 B2
(45) Date of Patent: May 2, 2017

(54) MULTIPLEXED FORMS

(75) Inventors: John M. Boyer, Victoria (CA); David F. Manning, Victoria (CA); Michael C. Mansell, Victoria (CA)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 12/783,534

(22) Filed: May 19, 2010

(65) Prior Publication Data

US 2010/0299389 A1    Nov. 25, 2010

(51) Int. Cl.
*G06F 17/24* (2006.01)
*G06F 17/22* (2006.01)

(52) U.S. Cl.
CPC ........ *G06F 17/243* (2013.01); *G06F 17/2229* (2013.01); *G06F 17/2247* (2013.01)

(58) Field of Classification Search
None
See application file for complete search history.

(56) References Cited

U.S. PATENT DOCUMENTS

| | | | | |
|---|---|---|---|---|
| 5,960,204 A * | 9/1999 | Yinger | ...................... | G06F 8/61 709/221 |
| 6,070,177 A * | 5/2000 | Kao | .......... | G06F 17/30 707/999.01 |
| 6,108,673 A * | 8/2000 | Brandt | ...................... | G06F 8/30 715/236 |
| 6,212,534 B1 * | 4/2001 | Lo | ........................ | G06Q 10/10 715/205 |
| 6,557,015 B1 * | 4/2003 | Bates | ................ | G06F 17/30876 707/E17.112 |
| 6,725,229 B2 * | 4/2004 | Majewski | ............... | H04M 3/22 379/114.03 |
| 6,925,594 B2 * | 8/2005 | Dutta | ................ | G06F 17/30899 707/999.01 |
| 7,313,757 B2 * | 12/2007 | Bradley | ................ | G06F 17/243 715/222 |
| 7,363,579 B2 * | 4/2008 | Vasey | .................. | G06F 17/218 715/256 |

(Continued)

FOREIGN PATENT DOCUMENTS

| CA | 2517804 A1 | 2/2007 |
|---|---|---|
| CA | 2588164 A1 | 11/2007 |

OTHER PUBLICATIONS

Mark Neeham, Ruby:Unzipping a file using rubyzip, Oct. 2, 2008, printed Mar. 22, 2016, pp. 1-6.*

(Continued)

*Primary Examiner* — Backhean Tiv
(74) *Attorney, Agent, or Firm* — Steven M. Greenberg, Esq.; CRGO Law (57) ABSTRACT

A system for presenting and executing a multiplicity of interactive forms as a single document includes a server having one or more copies of a multi-form package and configured to deliver a copy of the package to a requesting device upon request. The system also includes a client computing device configured to request and receive the multi-form package, the first computing device including an application program and a multi-form document engine configured to receive commands from the application program and, in response, cause forms from the multi-form package to be presented and executed.

20 Claims, 4 Drawing Sheets

(56) References Cited

U.S. PATENT DOCUMENTS

| | | | | |
|---|---|---|---|---|
| 7,555,564 | B2* | 6/2009 | Gimson | G06F 17/30905 709/203 |
| 7,577,906 | B2* | 8/2009 | Friedrichowitz | G06F 17/243 707/999.008 |
| 7,752,537 | B2* | 7/2010 | Beynon | G06F 17/243 715/221 |
| 7,761,601 | B2* | 7/2010 | Falkenburg | G06F 17/30905 709/246 |
| 7,818,215 | B2* | 10/2010 | King | H04N 1/00244 382/229 |
| 7,818,677 | B2* | 10/2010 | Ruthfield | G06F 3/0481 715/749 |
| 8,032,626 | B1* | 10/2011 | Russell | H04L 67/02 709/223 |
| 8,108,464 | B1* | 1/2012 | Rochelle | H04L 51/00 709/204 |
| 2001/0020243 | A1* | 9/2001 | Koppolu | G06F 17/30855 715/205 |
| 2003/0052920 | A1* | 3/2003 | Carter | G06F 17/30011 715/764 |
| 2004/0111664 | A1* | 6/2004 | Hull | H04N 1/00413 715/277 |
| 2004/0123284 | A1* | 6/2004 | Bryant | G06F 8/61 717/174 |
| 2004/0205644 | A1* | 10/2004 | Shaughnessy | G06F 17/24 715/255 |
| 2005/0010871 | A1* | 1/2005 | Ruthfield | G06F 3/0481 715/712 |
| 2005/0154779 | A1* | 7/2005 | Cypher | G06F 17/30893 709/202 |
| 2005/0177784 | A1* | 8/2005 | Andrews | G06F 17/2229 715/234 |
| 2005/0210009 | A1* | 9/2005 | Tran | G06Q 10/10 |
| 2005/0246642 | A1* | 11/2005 | Valderas | G06F 3/0481 715/730 |
| 2006/0026502 | A1* | 2/2006 | Dutta | G06Q 10/10 715/230 |
| 2006/0117307 | A1* | 6/2006 | Averbuch | G06F 17/2247 717/143 |
| 2006/0149758 | A1* | 7/2006 | Ornstein | G06F 17/211 |
| 2007/0226635 | A1* | 9/2007 | Goebel | G06F 17/30905 715/745 |
| 2008/0098018 | A1* | 4/2008 | King et al. | 707/101 |
| 2008/0163199 | A1* | 7/2008 | Rao | G06F 8/61 717/177 |
| 2008/0172598 | A1* | 7/2008 | Jacobsen | G06F 17/243 715/224 |
| 2008/0215957 | A1* | 9/2008 | Rapp | G06Q 10/10 715/200 |
| 2008/0219553 | A1* | 9/2008 | Akiyama | G06K 9/38 382/173 |
| 2009/0024993 | A1* | 1/2009 | Reus | G06F 8/60 717/177 |
| 2009/0324065 | A1* | 12/2009 | Ishida | G06K 9/00456 382/164 |
| 2010/0070844 | A1* | 3/2010 | Aymeloglu | G06F 17/2288 715/229 |
| 2010/0091322 | A1* | 4/2010 | Kim | G06K 15/02 358/1.15 |
| 2010/0110095 | A1* | 5/2010 | Sekiguchi | G06F 21/84 345/589 |
| 2010/0174997 | A1* | 7/2010 | O'Sullivan | G06Q 10/10 715/751 |
| 2010/0250926 | A1* | 9/2010 | Ji | G06F 21/10 713/165 |
| 2010/0254604 | A1* | 10/2010 | Prabhakara | G06K 9/00469 382/173 |
| 2010/0262908 | A1* | 10/2010 | Gallo | G06F 17/30011 715/704 |
| 2010/0299389 | A1* | 11/2010 | Boyer | G06F 17/2229 709/203 |
| 2011/0153571 | A1* | 6/2011 | Walker | G06F 11/1435 707/654 |
| 2013/0179774 | A1* | 7/2013 | Wang | G06F 17/22 715/234 |

OTHER PUBLICATIONS

[H]ardForum, How to extract only 1st file in list of archives, Feb. 3, 2009, printed Mar. 21, 2016, pp. 1-7.*

PCreview, Extracting file from a zip file, Nov. 16, 2008, printed Mar. 22, 2016, pp. 1-14.* nixCraft, Tar Extract a Single File(s) from a Large Tarball, Dec. 6, 2008, printed Mar. 22, 2016, pp. 1-14.*

* cited by examiner

MULTIPLEXED FORMS

CROSS-REFERENCE TO RELATED APPLICATIONS

This application claims priority under 35 U.S.C. §119(a) to Canadian Patent Application Serial Number 2666212, filed May 20, 2009 entitled "MULTIPLEXED FORMS", the entirety of which is incorporated herein by reference.

BACKGROUND

The present invention relates to forms, and more specifically, to multiple computerized forms that must operate together to collect data.

The term "document" as used in computer based and produced documents is a convenient metaphor for representing an instance of a form application because it allows the end-user to save, email and digitally sign a complete digital representation of their interactions with the form application and the full context of those interactions. The document is also a convenient metaphor for forms application developers as it gives them a single digital asset that can be routed through a business process, encapsulate the full user experience definition for a rich interactive application, and contain all user input, attachments and digital signatures related to a business process transaction. Thus, it is also easy to offer an offline or disconnected form fill experience to end-users.

However, many business processes require a user to interact with more than one related form. For example, an insurance claim, loan agreement, grant proposal or tax form may consist of a primary form to collect the root data of the transaction as well as numerous additional forms that may conditionally need to be filled out depending on data supplied earlier in the fill experience. There are two solutions to this problem currently in practice. The first is to construct a web application from the collection of forms. The disadvantage of this approach is that it loses the many benefits of a document-centric architecture. The application is no longer expressed as a single document, so the user cannot have an offline or disconnected fill experience. That is, the user is no longer able to locally save a document representing the whole insurance policy, loan agreement, grant proposal or tax filing. If the user tries to email the form they are working on to someone else for collaboration, the context of that form within the web application is either lost or very difficult for the application to maintain. Further, a digital signature on a form in the application protects only that form and not necessarily the full transaction represented by the web application logic. Finally, having to involve server programmers to code web application logic is diametric to the simplification theme at the heart of declarative, document-centric electronic forms technology. It is therefore preferable to meet the functional requirements of multiple form applications by extending the capabilities of the electronic forms system.

The second solution is to cram the logical components of the multiple forms into a single form. In principle, this preserves the document-centric benefits of the web application, but in practice there are consequences for run-time performance, design-time understandability, maintainability and collaborative capability. At run-time, the single document takes much longer to start up and consumes much more memory to represent the run-time structures. The performance of interactional operations degrades because the single document is maintaining a larger, global run-time system of data structures for all logical components, rather than being narrowly focused on the logical components that are applicable to the user experience.

SUMMARY OF THE INVENTION

According to one embodiment of the present invention, a method for presenting, on a client computing device, a plurality of interactive forms as a single document is provided. The method includes receiving at a server a request from the client computing device for a multi-form document; creating at the server, in response to the request, a package containing some or all of the portions of the multi-form document, the package including instructions for navigating from one portion to the multi-form document to another portion of the multi-form document; transmitting the package to the client computing device; providing a first form from the package to a form processor resident on the client computing device; and sequentially providing at least one other form from the package to the form processor, the sequence being determined by at least one of navigation instructions in the package and data collected by the form processor.

Another embodiment of the present invention is directed to a system representing and executing a multiplicity of interactive forms as a single document that includes a server having one or more copies of a multi-form package and configured to deliver a copy of the package to a requesting device upon request. The system also includes a client computing device configured to request and receive the multi-form package, the first computing device including a form processor and a document execution engine configured to receive commands from the form processor and, in response, cause portions of the multi-form package to be loaded into memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The current method of multiplexing forms is to combine all the logical forms, data, model business rules, images, attachments, wizard step pages and so forth into a single monolithic form. This creates a form that has performance problems and design maintainability problems due to its size and complexity. A method is, therefore, needed that allows forms application components to remain separate yet together as the application is instantiated as a document which then traverses the business process lifecycle.

Embodiments of the present invention may overcome some or all of these and possibly other problems by providing systems and methods for storing all the components as separate files within a single compressed archive file (document) that conforms to the ODF (open document format) packaging format. Then, the multiplexing technology taught herein defines a processing model that enables the capabilities of a server-side web application to be deployed to a client (operating as a rich client plugin or as a web browser) as a single document, without loss of a consumable division of logical components of the application.

In more detail, the prior art monolithic form stores in a single XML (eXtensible Markup Language) document all images, all supporting document attachments provided by end-users, all XML data instances and business rule models, all form pages needed for various wizard experiences, and all forms with a high-precision, contractual view of some aspect of the overall business process or transaction. As an "ODF package" of files, embodiments of the present invention allow for logical components to be stored as separate files. In one embodiment, a package containing all of the logical components stored as separate files may be provided. This package may be zipped and only those portions currently being accessed unzipped and loaded into active memory. After completion, the ODF package format provides a format for serializing a single "ODF package" document that represents an instance of the modularized forms application.

In one embodiment, the ODF package of the present invention may include one or more logical files to represent data to be collected by the document, one or more logical components to import the data and apply business rules to the data (at times referred to herein as XForms models), one or more logical form files containing forms capable of reading from and writing to the logical data files of the document, and a logical component representing a form navigation state machine containing the descriptions of how and under what conditions to transition between forms. In other embodiments, the package may include a navigational state description indicating the current form immediately applicable to the user experience of the document. In addition, the package may include a form processor. This form processor may be responsive to a document engine resident on the client that invokes a particular form. The document execution engine may be capable of reading the document, executing its current form including document data read and write operations, changing the current form based on the conditions of the navigation state description, and serializing the document as altered by end-user interaction with one or more contained forms.

Additional capabilities may include the ability for the document execution engine to transmit the document serialization to a server, store the document serialization to a local disk file, allow attachments to be added to the package, the ability of any form to extract, remove or display attachments from the logical file set of the document, generate a digital signature into a logical data file of the document (package) and this signature may refer to one or more of the logical files in the document, and the ability to have a logical data file specify the document print operation in terms of printing any subset of pages from any number of the logical forms in the document. One advantage of the present invention is that multiple forms are multiplexed into a single document, preserving the overall document-centric application architecture. The aspects described above may allow a web application consisting of multiple forms to be represented at run-time by a single document in a performant manner. Operations such as printing, digital signing, file attachment, and local file save may be defined in terms of the overall document, rather than a single form in the document. The save operation allows the user to obtain a copy of the document that can be reloaded at a later time to continue working or emailed to other collaborators in an ad hoc workflow scenario. The submission capability allows the full document representing the application instance to get back to the server to participate in the business process. The system architecture also supports the application design experience. Since the document is comprised of a set of logical files for the logical components, the components of the application can be stored in an actual file directory at design time.

Figure 1:
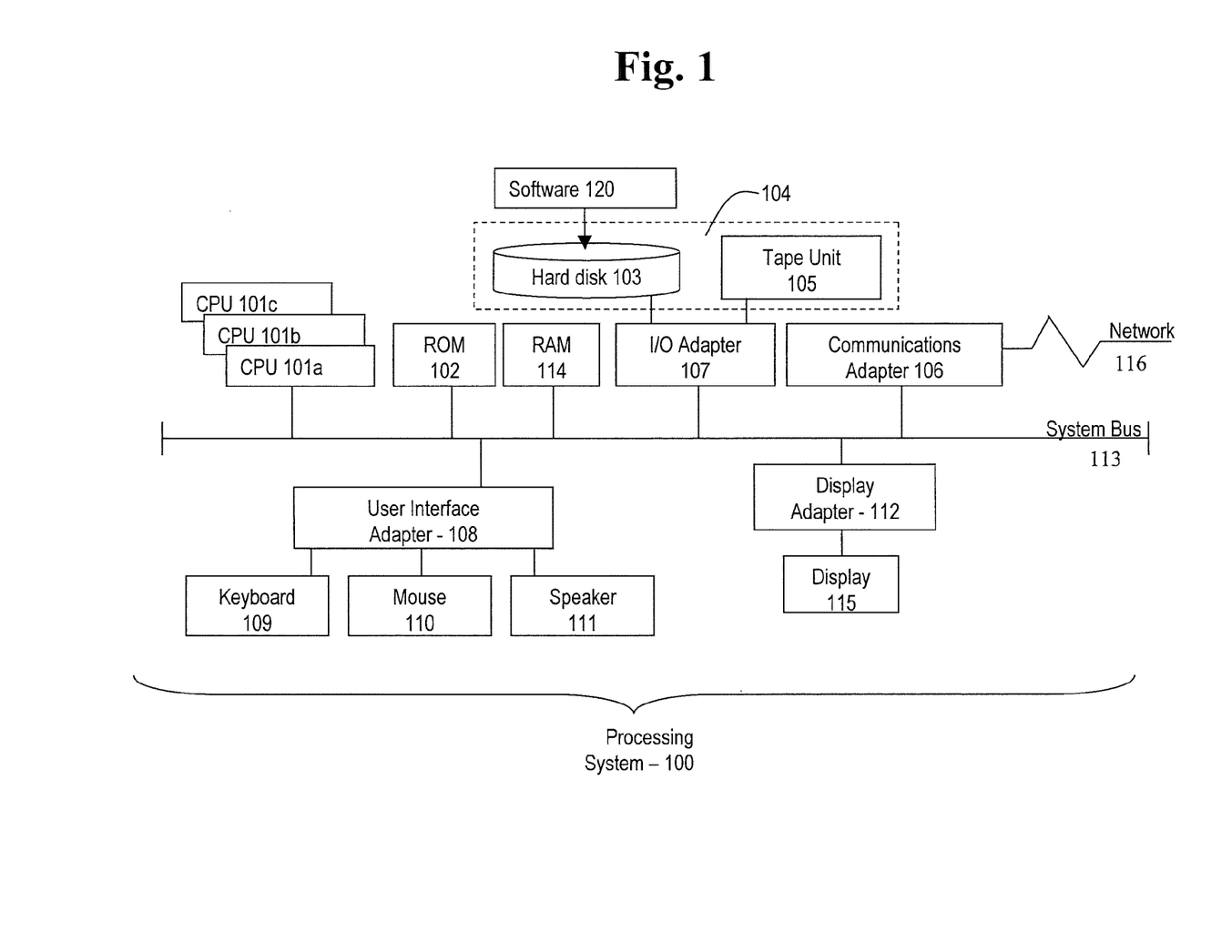
FIG. 1 shows a computing device according to one embodiment of the present invention.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing means in the form of processors 101, storage means including system memory 114 and mass storage 104, input means such as keyboard 109 and mouse 110, and output means including speaker 111 and display 115. In one embodiment, a portion of system memory 114 and mass storage 104 collectively store an operating system such as the AIX® operating system from IBM Corporation to coordinate the functions of the various components shown in FIG. 1.

It will be appreciated that the system 100 can be any suitable computer or computing platform, and may include a terminal, wireless device, information appliance, device, workstation, mini-computer, mainframe computer, personal digital assistant (PDA) or other computing device. It shall be understood that the system 100 may include multiple computing devices linked together by a communication network. For example, there may exist a client-server relationship between two systems and processing may be split between the two.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, or any other suitable operating system. The system 100 also includes a network interface 106 for communicating over a network 116. The network 116 can be a local-area network (LAN), a metro-area network (MAN), or wide-area network (WAN), such as the Internet or World Wide Web.

Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11(a), 802.11(b), 802.11(g)).

As disclosed herein, the system 100 includes machine-readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as a "command line testing tool" 120, an "a testing interface" 120 or by other similar terms. The software 120 may include various tools and features for providing user interaction capabilities as are known in the art.

In some embodiments, the software 120 is provided as an overlay to another program. For example, the software 120 may be provided as an "add-in" to an application (or operating system). Note that the term "add-in" generally refers to supplemental program code as is known in the art. In such embodiments, the software 120 may replace structures or objects of the application or operating system with which it cooperates.

Figure 2:
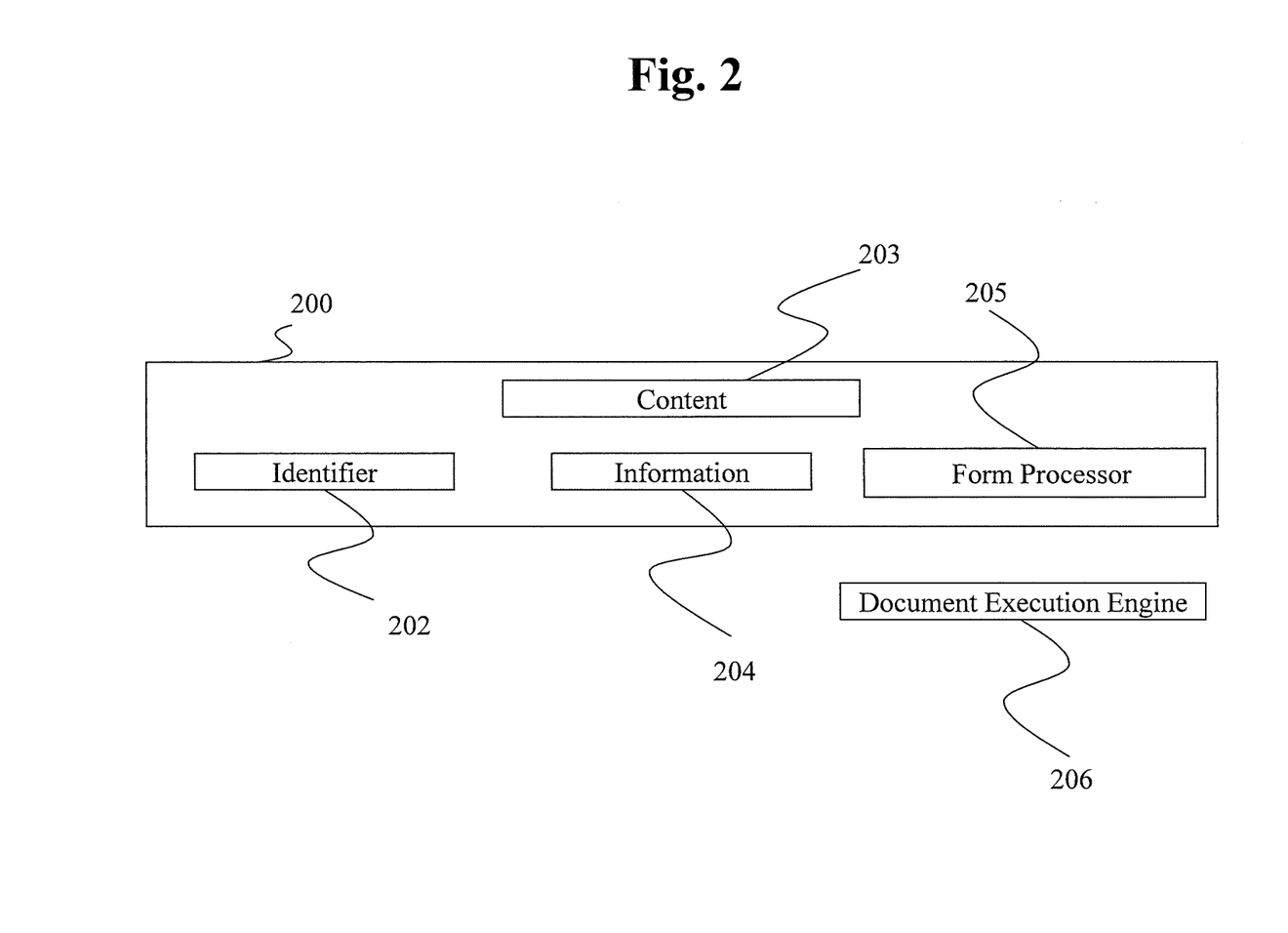
FIG. 2 shows a multi-form package according to one embodiment of the present invention.

FIG. 2 shows an example of package 200 according to the present invention. The document 200 may be implemented in an ODF format and may be referred to herein as a package. In one embodiment, the document includes an identifier portion 202. The identifier portion 202 may include a MIME (Multipurpose Internet Mail Extension) type, a content-type and a file suffix that are distinct from those used by single-form applications. This may allow an agent runtime engine (such at Lotus Forms) to recognize the content and process it using the multiplexing document execution engine 206. In one embodiment, the multiplexing document execution engine 206 may be previously installed on the host. In operation, the document engine may communicate with the form processor 205. In one embodiment, the form processor 205 may be part of the package 200. Of course, form processor 205 could also be a separate entity resident on the client computing device prior to the transmission of package 200 to the client computing device. This form processor may be responsive to a document engine resident on the client that invokes a particular form from package 200. The document engine 206 may be capable of reading the document, using form processor 205 to execute the current form of the document and perform document data read and write operations, changing the current form based on the conditions of the navigation state description, and serializing the document as altered by end-user interaction with one or more contained forms.

Regardless, a rich client viewer agent shall be capable of running the multiplexed forms document in offline/disconnected mode as well as within a web browser. The thin client online user agent shall be capable of executing the multiplexed forms document execution engine on the server side and serving out the HTML translation for the active page of the current form to a web browser for end-user interaction.

According to the ODF packaging format, the main file is called content.xml. Accordingly, the package 200 may include a file called content 203. In one embodiment, the schema for content 203 is specific to the type of document. In the case of multiplexed forms applications, content 203 may include a simple schema that indicates the current form file on which to begin processing if the document is launched (this setting may be adjusted whenever the user navigates to a new form in the document), the base URI of the server from which the document was first obtained (assuming the document 200 was obtained from the web), and a document-level definition for the print operation.

One embodiment of the present invention utilizes features of open standards such as XForms, XML signatures, and the ODF packaging format. In particular, the URI is the typical means by which both XForms and XML signatures interact with external entities, and the ODF packaging format defines the notion of a package-relative URI, which allows resources in a package to refer by URI to other resources in the same package. In one embodiment, anywhere that the XForms and XML signatures standards allow URIs, a package-relative URI may be used. This allows the conceptual model for the document execution engine (i.e., the client) to be quite similar to the standard client/server web application, even though the document engine 206 is technically a client technology that may run in the same location as the electronic form run-time processor (for example, Lotus Forms Viewer) or in a remote location distinct from both the client location and the server-side web application (for example, Lotus Forms Web Form Server).

In one embodiment, the package 200 includes an information portion 204. The information portion 204 may include, in one embodiment, information entered by users as well as the forms and rules related thereto. In one embodiment, the information portion 204 may include wizard pages, images, form pages, attachments, data instances and XForms models.

Figure 3:
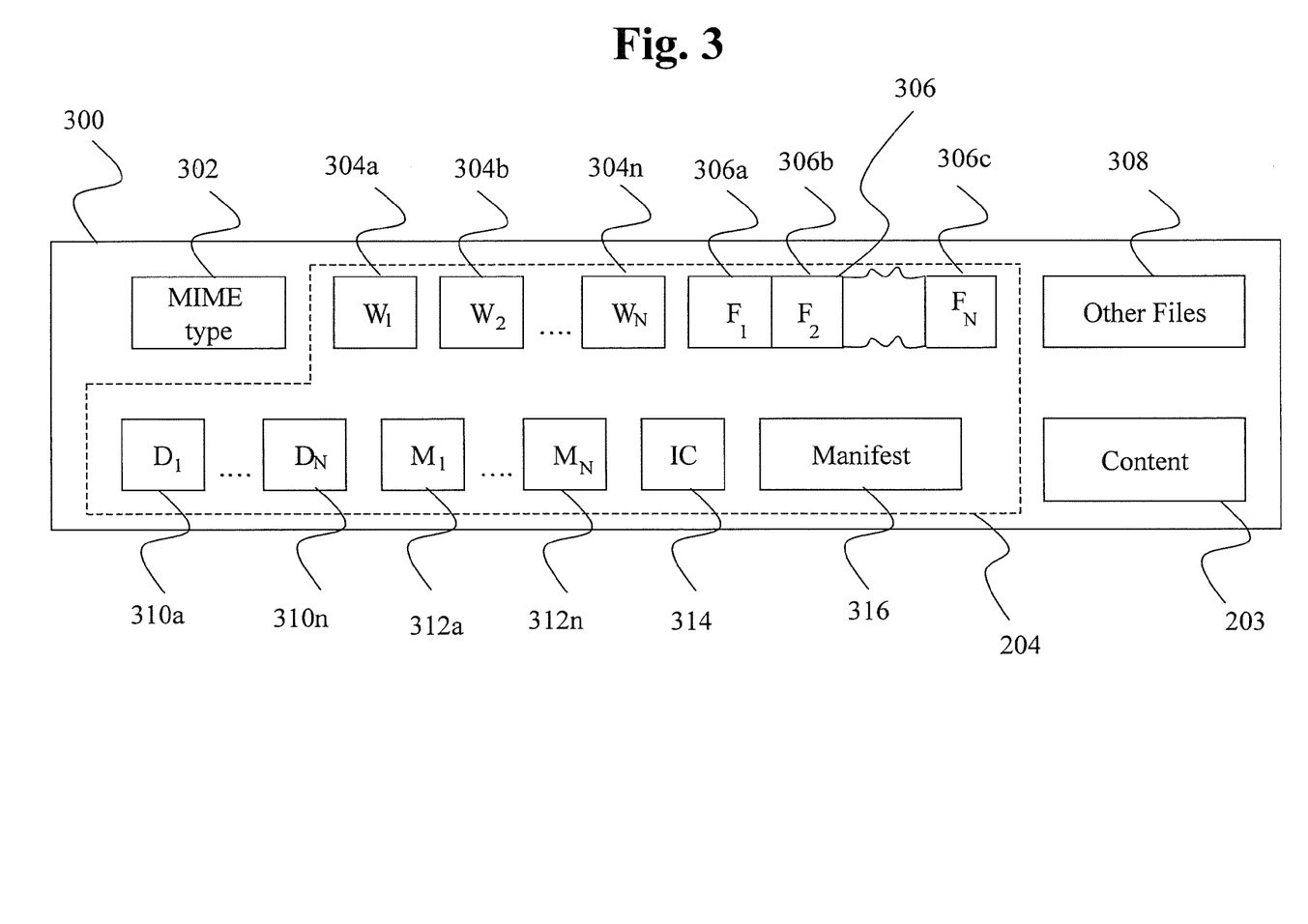
FIG. 3 shows a more detailed version of the package shown in FIG. 2.

FIG. 3 shows a more detailed depiction of a package 300 according to an embodiment of the present invention. In one embodiment, the package includes a MIME type indicator 302. The MIME type indicator 302 indicates the type of information that is contained in the package 300. The package 300 may also be assigned a content type and a file suffix that are distinct from those used by single-form applications. The names, locations and content types of the components within package 300 may be stored, for example, in the manifest block 316.

As discussed above, the package may include an information portion 204. The information portion 204 may contain, for example, in one embodiment, wizard pages, images, form pages, attachments, data instances and XForms models. The information portion 204 may also include an interaction controller 314 that controls the movement between form pages. In one embodiment, the interaction controller is not a separate entity, but rather consists of instructions embedded within wizard pages 304 and forms 306.

The package 300 may also include one or more wizard pages 304a ... 304n. These wizard pages 304 may include programming that causes a display screen to display a form with blanks to be filled in by a user. These blanks may be prompted by questions or other means is receiving a response. Naturally, the forms application developer may have the option to separate all wizard pages into separate resources, or to group together sets of related wizard pages into a single form within the package 300. Similarly, single and multiple-page "contract view" forms (labeled as element 306 in FIG. 3) can be stored in the package 300. Any of the wizard pages or forms may request or allow for a user to add an attachment (such as an image, a word processing file or a spreadsheet) to the package. In one embodiment, the attachment may be stored in a block 308 of other files such as attachments, scripts, stylesheets and images.

The package 300 may also include data blocks 310a ... 310n. The data stored in the data blocks 310 is received by the wizard pages 304. In one embodiment, the data blocks may contain XML data instances. One or more of the forms 306 may use the information stored in data blocks 310. The forms 306 may represent the final contract, agreement or transaction to be created. Of course, the forms 306 may be saved or printed at any point in the creation thereof. according to embodiments of the present invention. In one embodiment, data blocks 310 may be stored within content 203 rather than as separate entities.

The information section 204 may also include data models 312. These data models 312 may contain business or other models that are to be adhered to in the creation of the final document. For example, the XForms models may include, based on information already received, additional information that may be needed. In one embodiment, data models 312 may be stored within wizard pages 304 and forms 306 rather than as separate entities.

To maximize efficiency of a multiplexed forms application, it may be necessary to decompose business rule models into subordinate models 312 and then aggregate carefully selected models for each form in the application instance document. To satisfy these needs, this section describes two straightforward features that may be present in embodiments of the present invention. First, an outer model can contain instance data, submissions, actions and binds as per the standard, but also any number of model elements. Each inner model can contain instances, actions, binds and still more models. All inner models contribute by simple inclusion to the outermost containing model, all contained model scan share data.

Second, to allow model sharing, it is possible for each page 304 or form 306 to import models 312 that are stored in separate logical files in the package. In one embodiment, the <xforms:model> is equipped with the src attribute, which can, in lieu of content, express a URI for the model content. In particular, note that resources within a container document can share models using package-relative URIs in the src attributes. The model content provided by the URI is used in lieu of any content that may appear within the <xforms:model> element. Combining the above two features, a monolithic model can be decomposed into its logical components and then precision model aggregation within each form of a package 300 can be achieved by using both model nesting and model sharing together. In short, data models 312 may refer to other data models 312 according to embodiments of the present invention.

As discussed above, some forms technologies, such as XForms, support an external referencing mechanism to obtain data, such as use of the src attribute on the <xforms:instance>element. Such an instance is called an external instance. According to embodiments of the present invention, the src attribute shall support package-relative URIs. A page 304 or form 306 may continue to use internal instances (i.e. an <xforms:instance> without an src attribute) to store ephemeral data that is only needed during user interaction with a particular wizard page 304 or form 306. However, an external instance should be used for XML data 310 that must be shared by more than one page 304 or form 306 in the package 300, and external instances are also available to allow a file in the document to be used when the data must be shared with external business processes. Note that the content obtained from a src URI may be used in lieu of any content appearing in an <xforms:instance>element. Navigation from one page to another in the same form is handled by the normal means available to the forms processor 205, but the new page to which the end-user navigates is recorded in content 203 so that a save and reload operation can resume with the same form and page as was being shown to the end-user at the time of the save operation. Navigation to a page 304 or to a page in another form 306 in the document 300 is accomplished with an <xforms:submission>whose resource attribute contains a package-relative URI to the new form and possibly an ID reference to a page within the form. Again, the new form and page are automatically written to content.xml to preserve the state of package in save/reload scenarios.

When the user navigates away from a form to another form in the document, any instance data that is not synchronized to the document would be lost. The ability to synchronize instance data during the navigation submission is supported via the ability to add an xforms-submit or xforms-submit-done handler that invokes submissions to put the instance data from the form to the multiplexing document along with a submission that navigates to a new page or form.

The package 300 may also include an interaction controller 314. The interaction controller 314 is configured to control transitions between pages. In one embodiment, the interaction controller 314 may include rules that define, based on user selections and data values, which page 304 or form 306 should be presented to the user next by the multiplexing document execution engine 206 or whether the document has been completed by the user and should be provided to the server-side application for processing or provisioning to another user in a workflow.

The package 300 may also include other files 308 such as images, user-provided attachments, scripts, and stylesheets that may be referenced by one or all of the pages 304 and forms 306. In such cases, it may be preferable to allow the other files to be referred to by package-relative URIs. If such is done, the pages 304 and forms 306 may share the other files while only requiring one copy of the file to be included in the package 300.

The XML Signatures standard defines an XML format for a digital signature that is capable of signing multiple resources by using one <dsig:Reference>element per resource. This allows a single signature to sign not only data 310, but also page 304 and form 306 templates, and other files 308 associated with presenting the data to the user, such as images, attachments, scripts and stylesheets. Therefore, digital signing within multiplexed forms application documents will be achievable by combining the notion of package-relative URI with the standard capabilities of XML signatures. Thus, XML signatures in the multiplexed forms application may typically involve the use of multiple <dsig: Reference>elements, all of which will have a URI attribute with a package-relative URI, to protect a multiplicity of forms, data files, and other resources in the containing document. An XML signature is created by an end-user, and the XForms philosophy is that the end-user modifies instance data. Therefore, XML signatures appear in data blocks 310. The generation of an XML Signature is triggered, for example, by a user action such as clicking a button user interface element associated with XFDL markup for a button of type signature. The location of the XML signature in instance data is based on the UI binding of the xforms: trigger within the XFDL button markup, which indicates the dsig:SignatureValue element of the signature to be generated. When the button is activated, the XML signature is generated. Because an XML Signature appears in instance data, the notion of "same document" refers to the instance data file in the multiplexing document. Thus, one <dsig: Reference>of an XML Signature will typically use the empty URI to indicate the containing data file, whereas the remaining <dsig:Reference>elements typically use package-relative URIs to indicate other components of the package 300.

Figure 4:
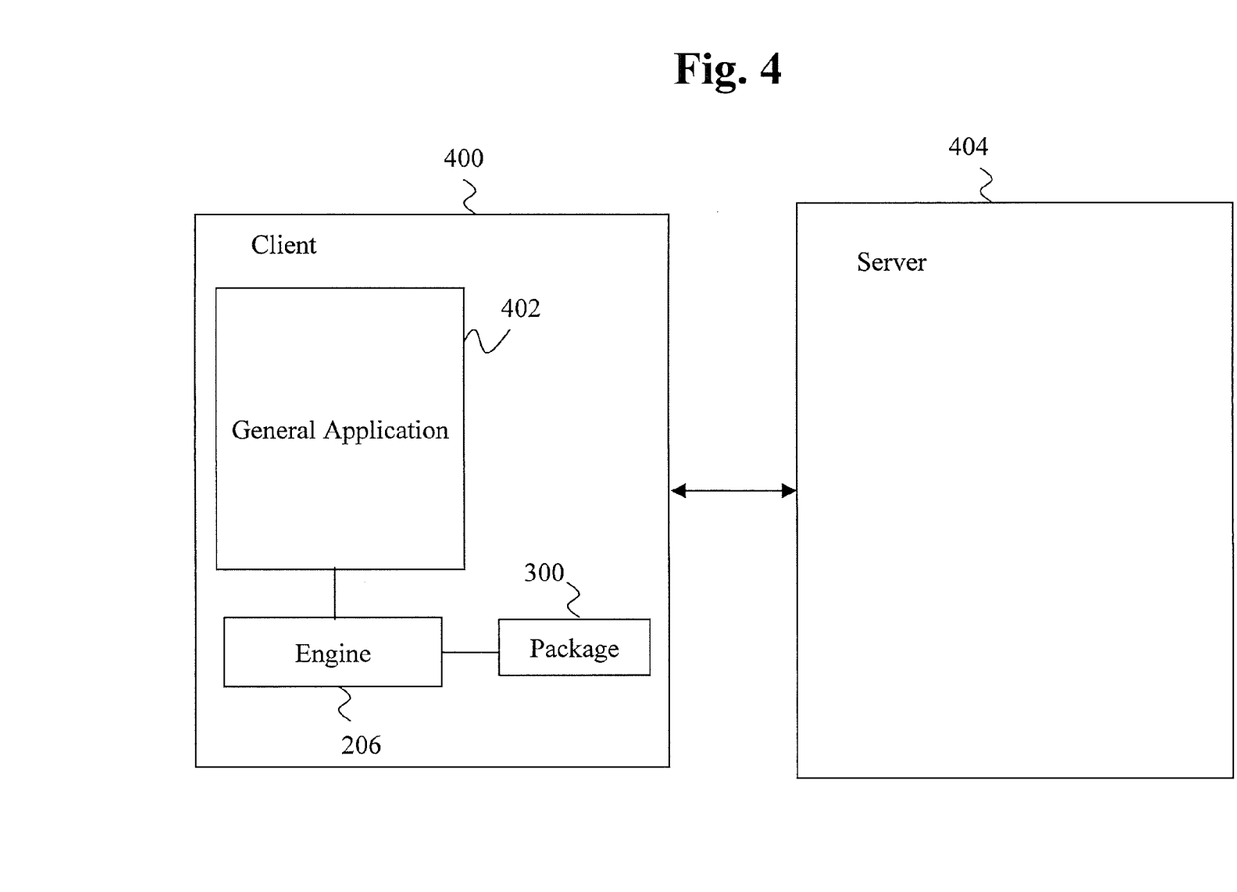
FIG. 4 shows a system on which the present invention may be implemented.

FIG. 4 shows an environment in which embodiments of the present invention may operate. The environment includes a client computing device (client) 400. This client 400 may be any type of computing device. Resident on the client 400 may be an application program 402 which may be referred to as a general application herein. The application program 402 may be any type of application that is capable of rendering a form and processing form data. Examples include, but are not limited to, Lotus Forms Viewer or the combination of a web browser and a javascript form processor. In one embodiment, the application may be a specific program designed to operate on particular packages 300 and may be provided to the client 400 by, for example, the server 404.

The general application 402 may operate on forms from the package 300. In one embodiment, once a first form from package 300 is delivered from engine 206 to the form processor 205 of the general application 402, the application program 402 uses instructions in the form to determine how to communicate with and control the package 300 through the engine 206. As discussed above, the multiplexing document execution engine 206 and general application 402 may be deployed to the client 400 separately, prior to the delivery of a package 300 to the client 400. However, as a component of general application 402, the form processor 205 may also be deployed separately to the client 400, or it may be delivered to the client 400 as part of package 300 and deployed by engine 206 prior to delivering a first form from package 300 to general application 402. In one embodiment not depicted in FIG. 4, the engine 206 may be deployed to an independent server machine or to server 404. In such case, the package 300 is delivered to the computing device that contains engine 206, and individual pages 304 and forms 306 are delivered from engine 206 to general application 402 on client 400 using, for example, a network connection.

In one embodiment, the server 404 may be configured in such a manner as to receive a request from the client 400 to create an instance of a multi-form document. For example, the server could receive a request from the client 400 to create a grant proposal. The grant proposal could be contained, for example, on the server 404 and could be a multi-form document having wizard pages and longer fill-in-the-blank forms and requiring that the collaborators on the grant proposal attach a curriculum vitae (CV). In the prior art, the server 404 may have had to create a version of the grant proposal and maintain that version, including all of the related wizard pages, rules, user attachments, etc. until the proposal was completed.

According to the present invention, the server 404 need only create a copy of the package 300 related to grant proposals and send that package 300 to engine 206.

Referring back to FIG. 3 and still with reference to FIG. 4, the processing of the package 300 may operate as follows. Upon delivery of a package 300 to engine 206, a first page 304 or form 306 is extracted from the package and delivered to the general application 402 for processing. In one embodiment, the general application 402 is a conventional form processing application such as, for example, Lotus Forms Viewer. Of course, the invention is not limited to any particular operating application. For example, if engine 206 is installed on an intermediary computing device rather than on client 400, then a further translation program, such as Lotus Forms Web Form Server, may be installed alongside engine 206 to help translate the individual pages 304 or forms 306 into dynamic HTML directly consumable by a web browser as the general application 402 on client 400. In this case, form processor 205 may be resident on the intermediary computing device or it may be transmitted to the web browser on client 400 along with the dynamic HTML translation of a page or form.

The engine 206 may operate as part of the general application 402 or may operate as a buffer between the general application 402 and the package 300. For the following description is assumed that the engine 206 is a separate entity from the general application 402. The following description assumes that the engine 206 may be in communication with a form processor (e.g., element 205 of FIG. 2) that is either part of general application 402 or provided to general application 402 by the package 300.

A user may use the general application 402 to request the package 300. The engine 206 receives this request and examines the content block 203. This examination may reveal the starting or current form that the general application 402 is to present to the user. As discussed above, the content block 203 may be updated as a user moves among pages 304 and forms 306 (e.g., from form 306a to form 306b) during operation.

The wizard pages 304 and forms 306 are created to prompt the user to provide information that may be stored, for example, in the data instances 310. The data instances 310 may be linked to one or more models 312. As data is placed in the data instances 310 the engine 206 may analyze any related model 312 to ensure that the data is in the correct format. In addition, based on the information received, the interaction controller 314 may indicate that additional forms need to be completed. In this manner, the interaction controller 314, based on predetermined rules or analysis by the models 312, controls the path taken through the pages 304 and forms 306 that are actually completed. In operation, some or all of the pages 304 and forms 306 may be used. As information is received and stored in the data instances 310 is may be used to populate pages 304 and forms 306 to which they are related. In one embodiment, the pages 304 and forms 306 link to the data in the data instances 310.

When the package 300 is completed, the entire package 300 may be returned to the server 404. The package 300 may only be complete, in some instances, when all of the persons required to provide information have done so. The interaction controller 314 may be queried to ensure that the package 300 is complete. This may include, for example, ensuring that all participants have completed the required forms. In addition, it should be noted, that the interaction controller 314 may be configured to keep track of the last page accessed so that as the package 300 is passed to different individuals, the first page accessed by the next person is the information that that individual is responsible for providing. In one embodiment, the package may be returned in a serialized form. Of course, the serialized package may, in some embodiments, only include the data instances, not the other wizards, rules, etc. originally contained in the package 300.

When serialized, the mime type of the returning package may be changed to indicate the content-encoding of base64 (to encode as base-64 the binary content of the ODF packaging format). In one embodiment, this may include an XForms submission method of "post" and the "replace" attribute should have the default "all" setting, which causes the submission data to be the entire multiplexing document. The shared instance data must also be synchronized to the document prior to full document submission. This capability is offered by the same mechanism as data synchronization for form navigation within the document. Specifically, the data can be synchronized using additional submission operations performed prior to the full document submission. In one embodiment, a prime mover submission begins the data synchronization submissions with an xforms-submit-done handler, and the xforms-submit-done handler on the last data synchronization submission initiates the full document submission.

One problem that may have existed in the prior art is that forms could not be saved and printed prior to their completion. Embodiments of the present invention may allow for both of these operations. For example, when a forms application (such as Lotus Forms) run-time is executing a multiplexed form according to the present invention, the save operation for that form is overridden to save the entire package 300. This type of save may allow for all of the portions of the package 300 to be saved, rather than just the current page. This may be controlled by the engine 206.

When the application Forms run-time is executing a multiplexed form, the print operation for that form is overridden by the printing definition in the package 300. The description of which forms and which pages to print shall be contained in the content block 203 file. This allows a traditional "contract" view of a multiple form application to be printed even if the end-user is currently working on a (non-printing) wizard page of the application. The multiplexing technology also offers the ability to dynamically change the print definition. Since the definition is contained by content.xml, which may be an XML data file, <xforms:submission>operations with get and put methods can be used to read and write the print definition by using a package-relative URI to the content.xml file.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

We claim:

1. A method for presenting, on a client computing device, a plurality of interactive forms as a single document, the method comprising:
   receiving at a server a request from the client computing device for a multi-form document comprising multiple forms;
   creating at the server in response to the request an open document format (ODF) package;
   inserting into the ODF package the multiple forms of the multi-form document, and also instructions for navigating from one form of the multi-form document to another form of the multi-form document;
   zipping the ODF package containing the multiple forms and the instructions;
   transmitting the package to the client computing device;
   unzipping the ODF package and providing a first one of the forms from the ODF package to a form processor resident on the client computing device while remaining ones of the forms remain contained in the zipped ODF package; and
   sequentially unzipping and providing at least one other of the forms from the package to the form processor while remaining ones of the forms remain in the ODF package, the sequence being determined by at least one of navigation instructions contained in the ODF package and data collected by the form processor.

2. The method of claim 1, wherein the form processor is transmitted to the client computing device as part of the package.

3. The method of claim 1, wherein the package includes at least one form configured to prompt a user to enter information.

4. The method of claim 3, wherein information received by at least one form is stored in at least one data instance contained in the package.

5. The method of claim 4, wherein the package includes at least one data model representing at least one business rule to be adhered to in preparation of at least one form in the package.

6. The method of claim 5, wherein the package includes an interaction controller configured to determine the next page to load based on at least one of a data model business rule and a piece of information received from the user.

7. The method of claim 1, further comprising:
loading a first form from the package into memory;
receiving information from a user;
storing the information in at least one data instance; and
based on the information, loading a second form from the package into memory.

8. The method claim 7, wherein only one form in the package is loaded into memory at any time.

9. The method of claim 4, wherein a digital signature generated by processing one form in the package may be stored in the package and applied to a plurality of forms and data instances in the package.

10. The method of claim 1, wherein the client computing device is comprised of two computing devices connected by a network, one of the computing device being equipped with the multi-form document engine and the other computing device being equipped with the general application and form processor.

11. The method of claim 1, wherein the multi-form document engine is configured to serialize some or all portions of the package and transmit the serialization of the multi-form document to the server.

12. The method of claim 11, wherein the multi-form document engine is configured to serialize some or all portions of the package and store the serialization of the multi-form document at the client computing device.

13. A system representing and executing a multiplicity of interactive forms as a single document, the system comprising:
a server having one or more copies of a zipped open document format (ODF) package created at the server and containing multiple forms of a multi-form document inserted into the ODF package, the ODF package also containing instructions for navigating from one form of the multi-form document to another form of the multi-form document, the server being configured to deliver a copy of the ODF package to a requesting device upon request; and
a client computing device configured to request and receive the ODF package, the first computing device including a form processor, an application program and a multi-form document engine configured to receive commands from the application program and, in response, cause forms from the ODF package to be loaded into memory by unzipping the ODF package and processing a first one of the forms from the ODF package while remaining ones of the forms remain contained in the zipped ODF package, and sequentially unzipping and processing at least one other of the forms from the package while remaining ones of the forms remain contained in the zipped ODF package, the sequence being determined by at least one of navigation instructions contained in the ODF package.

14. The system of claim 13, wherein the multi-form package includes a form processor that is loaded onto the client computing device when the package is received.

15. The system of claim 13, wherein the package includes at least one form configured to prompt a user to enter information.

16. The system of claim 15, wherein information received by at least one form is stored in at least one data instance contained in the package.

17. The system of claim 13, wherein the package includes at least one data model representing at least one business rule to be adhered to in preparation of at least one form in the package.

18. The system of claim 16, wherein a digital signature generated by processing one form may be stored in the package and applied to a plurality of forms and data instances in the package.

19. The system of claim 13, wherein the multi-form document engine is configured to serialize some or all portions of the package and transmit the serialization of the multi-form document to the server.

20. The system of claim 19, wherein the multi-form document engine is configured to serialize some or all portions of the package and store the serialization of the multi-form document at the client computing device.

* * * * *